April 10, 1945.  S. C. PLUMMER  2,373,413
TRANSFER APPARATUS
Filed May 3, 1940    5 Sheets-Sheet 4
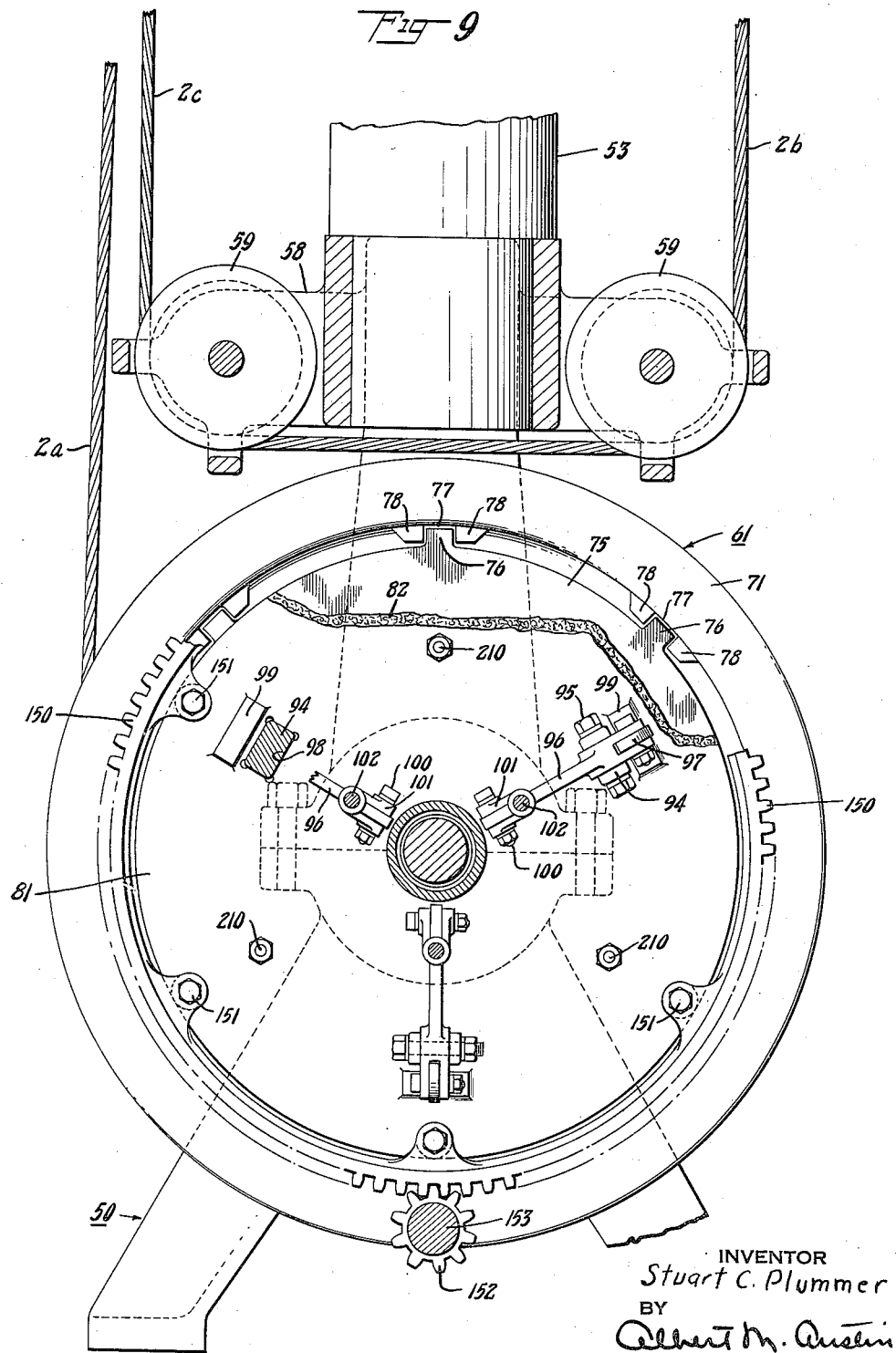
INVENTOR
Stuart C. Plummer
BY
Albert M. Austin
ATTORNEY April 10, 1945.   S. C. PLUMMER   2,373,413
TRANSFER APPARATUS
Filed May 3, 1940   5 Sheets-Sheet 5
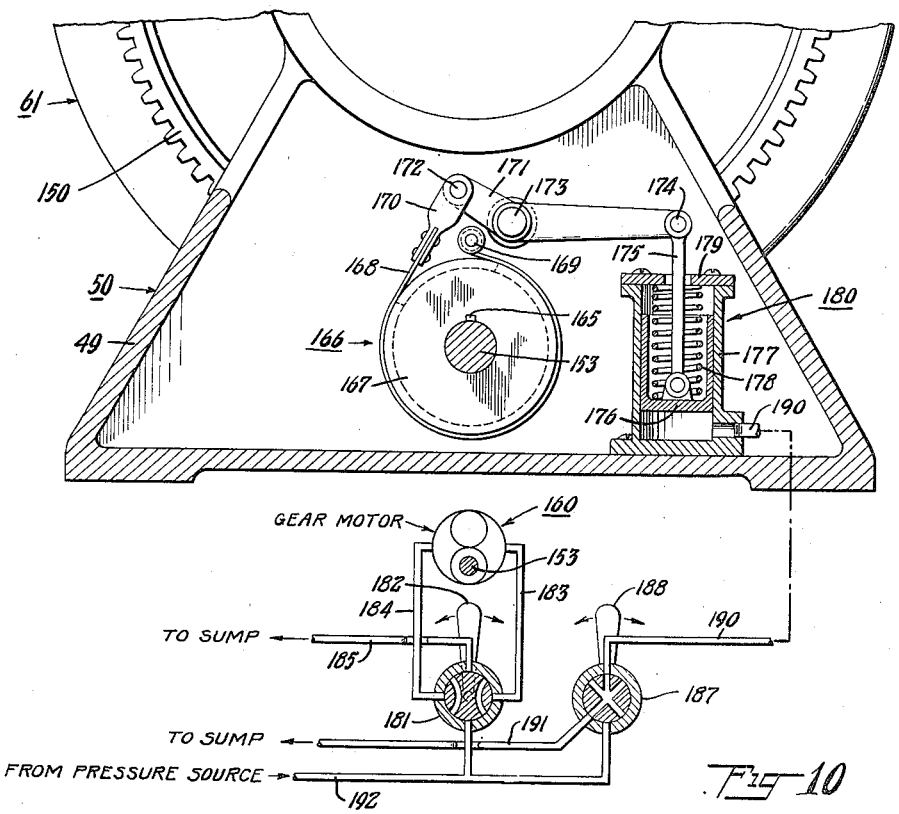
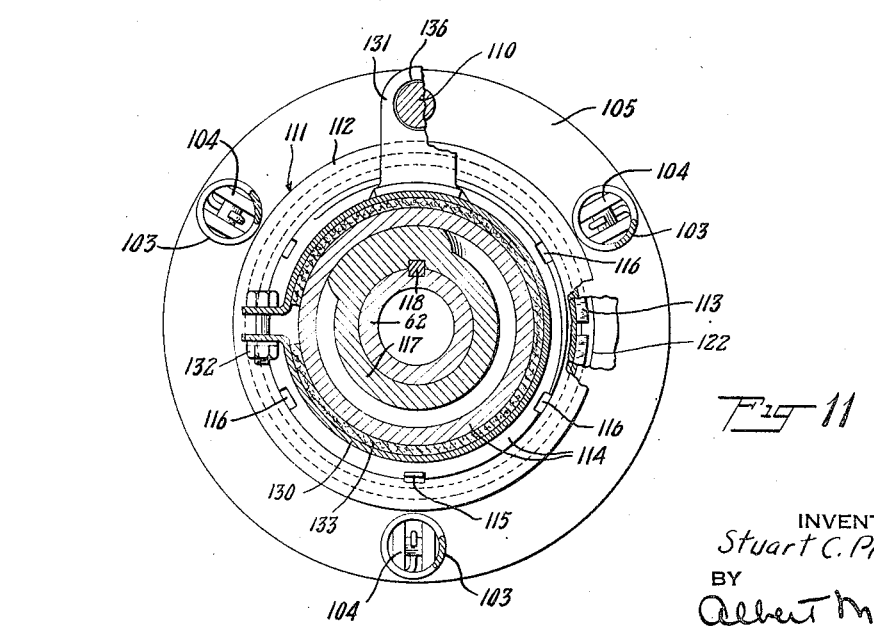
INVENTOR
Stuart C. Plummer
BY
Albert M. Austin
ATTORNEY Patented Apr. 10, 1945

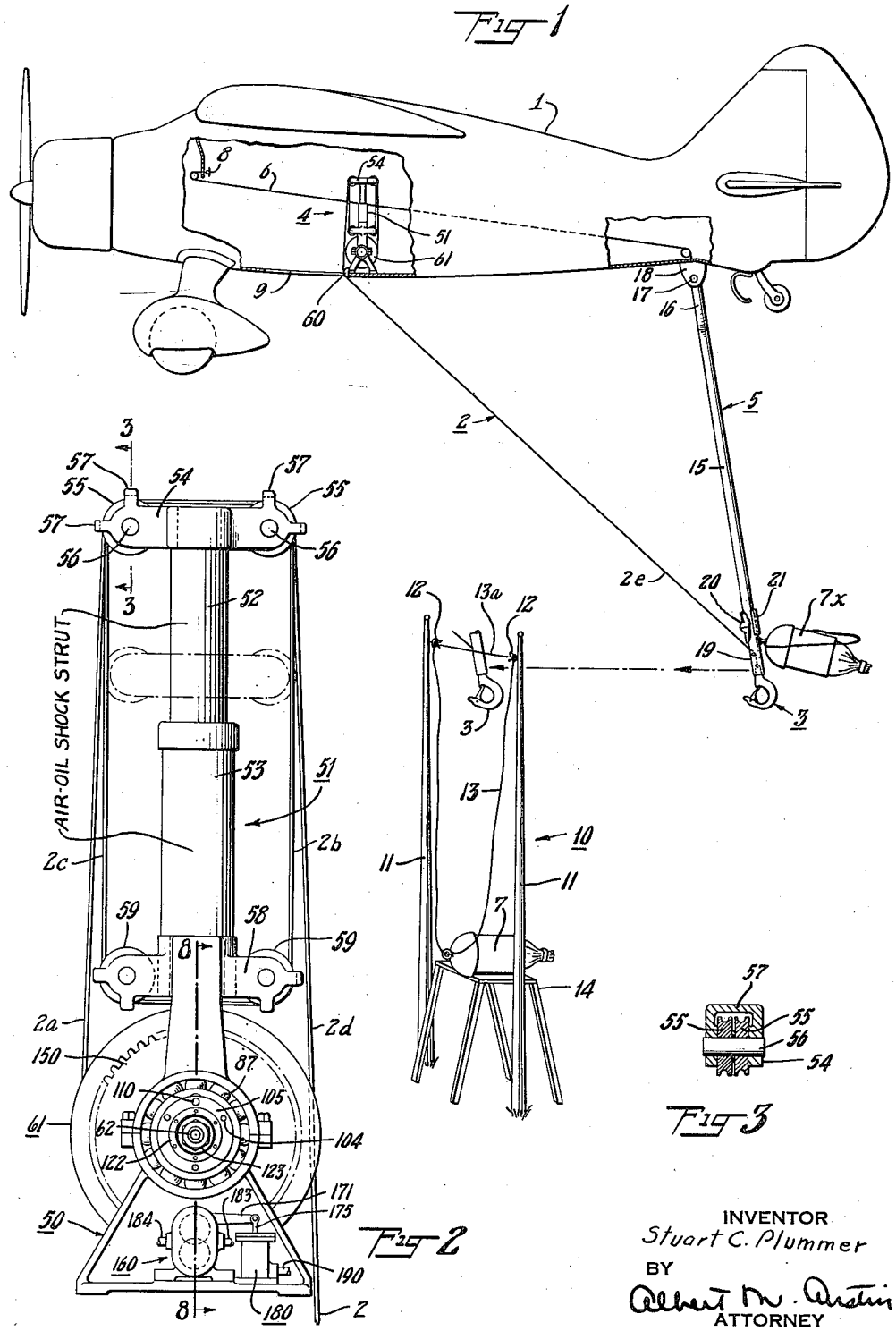

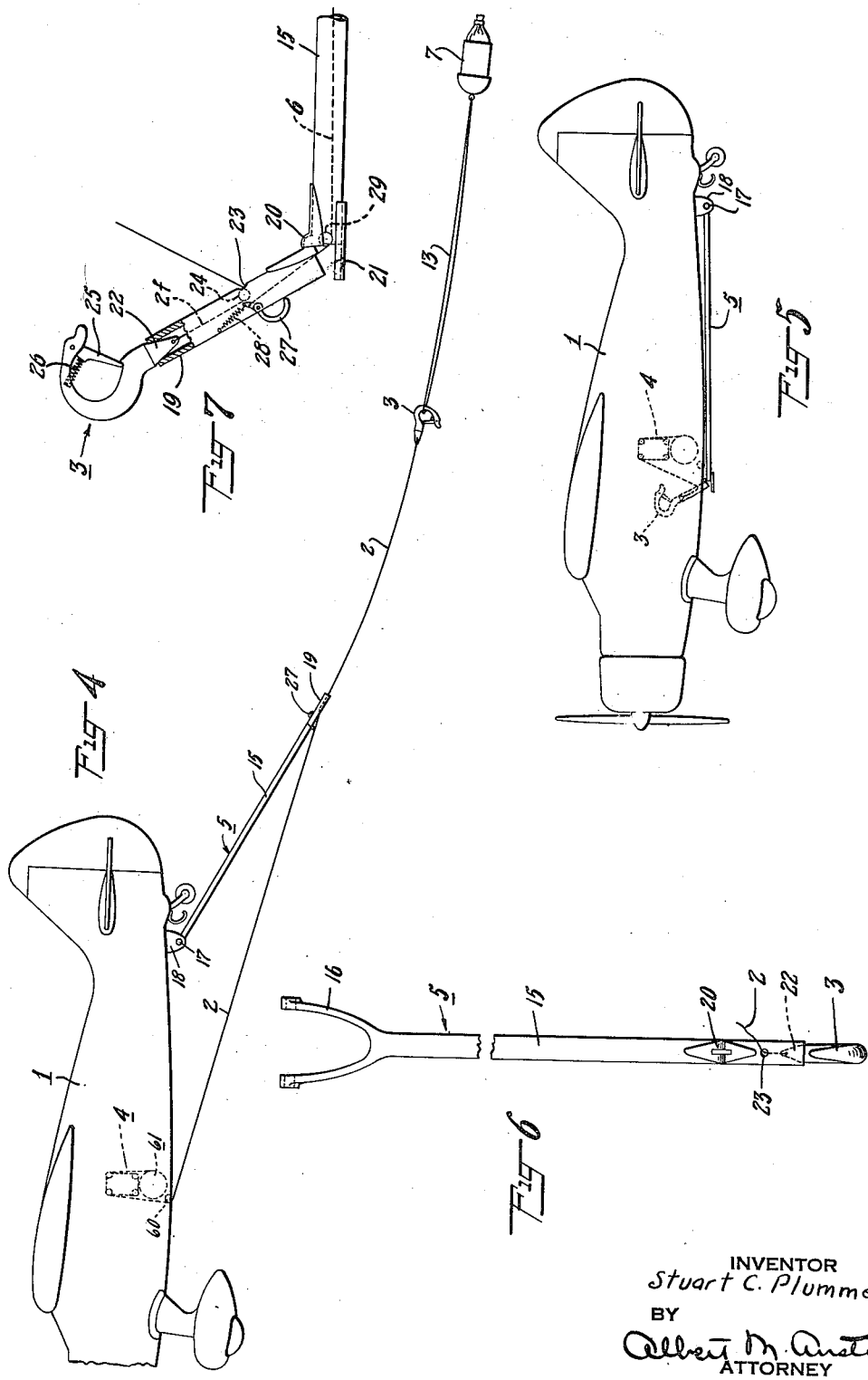

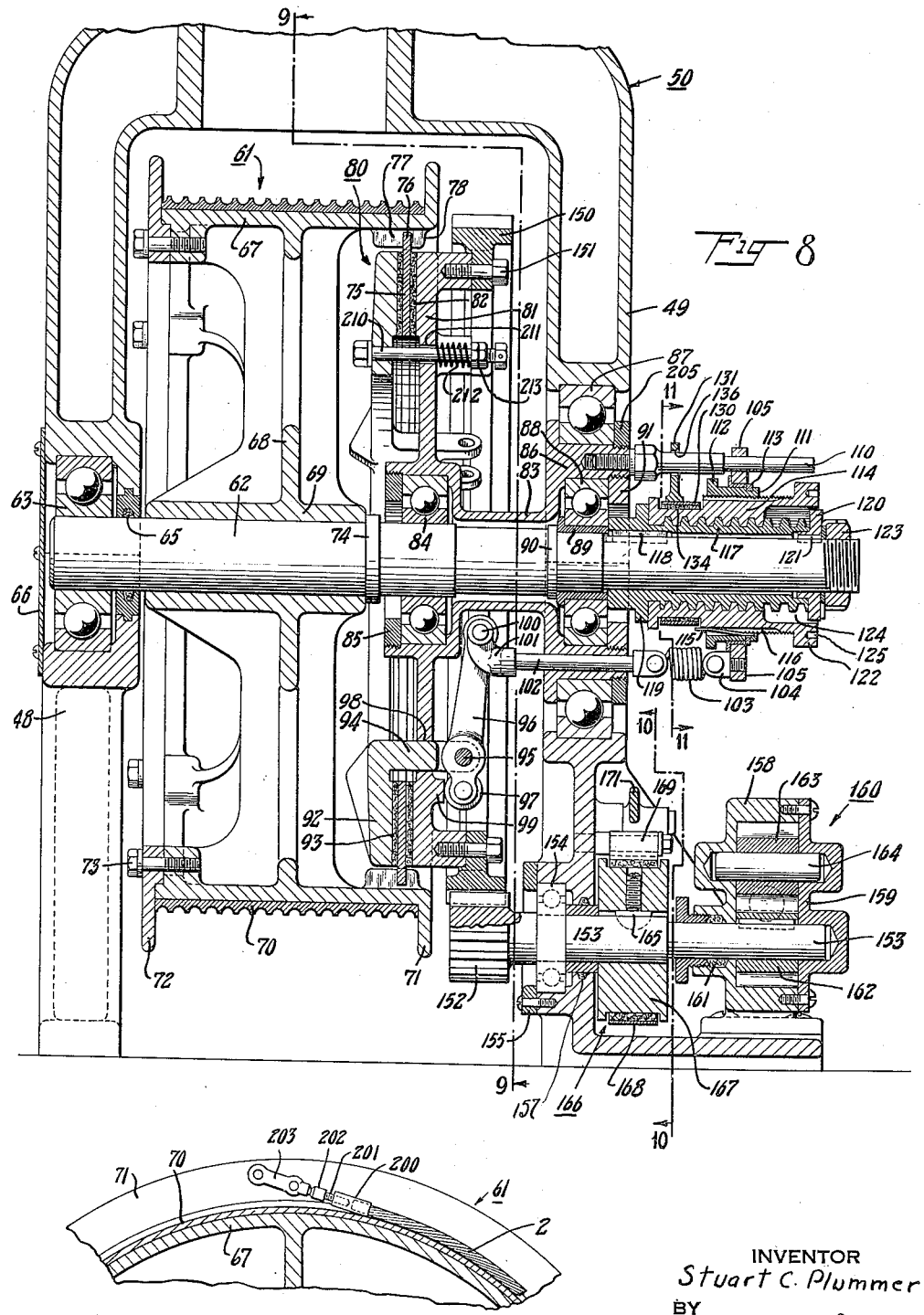

2,373,413

UNITED STATES PATENT OFFICE 2,373,413

TRANSFER APPARATUS

Stuart C. Plummer, Wilmington, Del., assignor to All American Aviation, Inc., Wilmington, Del., a corporation of Delaware Application May 3, 1940, Serial No. 333,081

19 Claims. (Cl. 258—1.2)

This invention relates to aircraft pick-up and delivery apparatus.

In pick-up and delivery systems of the type to which the present invention relates, the burden to be picked up is disposed at a ground station and a pick-up line or other device is attached to the burden and positioned for engagement by a hook trailed from the aircraft by a transfer line. The aircraft is flown past the ground station in such manner that the hook engages the pick-up line and thereby picks up the burden.

The burden ordinarily is accelerated from a position of rest to the velocity of the aircraft and hence, where the aircraft is traveling at a high rate of speed, as is usually the case, or the burden has substantial weight, the inertia which must be overcome and the shocks which must be absorbed are very substantial. It is, therefore, desirable to provide shock-absorbing means so that the forces incident to accelerating the burden are not applied to the aircraft or associated apparatus in such a manner as to cause undue shock to or strain to the aircraft, its pick-up equipment or the burden to be picked-up.

It is also desirable that the hook be guided positively into engagement with the pick-up line and that the transfer line to which the hook is attached be prevented from whipping about before and after the pick-up is effected.

In accordance with the present invention, the hook is suspended from the aircraft by a transfer line and the latter is connected to a take-up device, such as a reel, for controlling the paying out or drawing in of the transfer line. There is associated with the transfer line shock-absorbing means for absorbing at least a portion of the shock resulting from the initial engagement between the pick-up apparatus and the pick-up line or other device at the ground station, which the pick-up apparatus is intended to engage.

The shock or energy absorbing device is particularly necessary to prevent breaking of the cable while the reel is being accelerated. Automatic braking means is associated with the reel which means is effective, when the burden is engaged, to permit the transfer line to pay out under controlled restraint or drag, the drag being gradually increased whereby to accelerate the burden and to gradually cause it to assume the velocity of the aircraft. There is also provided means for releasing and adjusting the drag means and means controlling the reel for drawing in or paying out the transfer line.

An arm or other substantially rigid member, which is pivoted to the aircraft may be associated with the transfer line for the purpose of positioning and guiding the hook and for providing an additional initial shock-absorbing means. The arm is adapted to swing rearwardly when the initial contact with the pick-up line is made and is so positioned and dimensioned as to permit a movement of the hook relative to the aircraft greater than corresponds to the paying out of the transfer line from the reel.

An object of the present invention is the provision of aircraft pick-up and delivery apparatus having improved means for absorbing the shock incident to a pick-up operation.

Another object of the invention is the provision in apparatus of the class described of a mechanism for automatically controlling the initial paying out of the transfer line to which the pick-up hook is attached.

Still another object of the invention is the provision in apparatus of the class described of a simple, compact and rugged mechanism for absorbing at least a portion of the shock incident to the pick-up operation, for paying out a predetermined length of transfer line at a controlled rate and for controlling the drawing in or paying out of the transfer line.

A further object of the invention is to provide a means whereby the rate of acceleration of a burden picked-up may be controlled within limits.

A further feature of the invention is the provision in apparatus of the class described of means for damping out the shock transmitted to a reel at the time of pick-up and for accelerating said reel to make it effective as an additional energy absorber.

Various other features and advantages of the invention will be apparent from the following particular description and from an inspection of the accompanying drawings.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which:

Fig. 1 is a somewhat diagrammatic side elevational view of an aircraft having associated therewith the present invention constructed in accordance with the present invention, the aircraft being shown diagrammatically in relation to one form of ground station constructed in accordance with the invention;

Fig. 2 is an enlarged fragmentary, side elevational view of the mechanism for drawing in or paying out the transfer line, and the associated shock-absorbing means;

Fig. 3 is a fragmentary, vertical cross-sectional view taken along line 3—3 of Fig. 2;

Fig. 4 is a somewhat diagrammatic view showing the aircraft of Fig. 4 and associated pick-up mechanism in its position after the burden has been picked up;

Fig. 5 is a somewhat diagrammatic view of the aircraft and associated mechanism of Fig. 1 showing the transfer arm in retracted position;

Fig. 6 is an enlarged fragmentary, front elevational view of the transfer arm;

Fig. 7 is an enlarged fragmentary detail view of the end portion of the transfer arm;

Fig. 8 is an enlarged fragmentary, vertical cross-sectional view taken along line 8—8 of Fig. 2;

Fig. 9 is an enlarged fragmentary, vertical cross-sectional view taken along line 9—9 of Fig. 8;

Fig. 10 is a partially cross-sectional and partially diagrammatic view, the cross-sectional portion of the view being enlarged and taken along the line 10—10 of Fig. 8 and illustrating particularly the braking means for the gear motor, and the diagrammatic portion of the view being reduced in size for convenience and showing the motor and control means therefor;

Fig. 11 is an enlarged fragmentary, vertical cross-sectional view taken along the line 11—11 of Fig. 8, and Fig. 12 is an enlarged, fragmentary view showing the connection between the end of the transfer line and the reel.

In the following description and in the claims, various details will be identified by specific names for convenience, but they are intended to be as generic in their application as the art will permit. Like reference characters denote like parts in the several figures of the drawings.

Referring now particularly to Fig. 1 of the drawings, there is associated with an aircraft 1 of any suitable construction, a transfer line 2 having attached to its outermost end a hook 3 for effecting a pick-up. The transfer line 2 is suitably connected in the manner hereinafter more fully described, to a control device 4 for controlling the drawing in or paying out of the transfer line 2.

The transfer line 2 is guided by suitable mechanism hereinafter described adjacent the end of a transfer arm 5 by which arm the hook 3 can be positioned and guided and which arm 5 also serves as a shock-absorbing means as explained hereinafter. The arm 5 includes a principal portion 15 (see also Fig. 6) formed with a yoke 16 at its inner end by which the arm is pivotally connected as by a pivot pin 17 to a bracket 18 attached to the aircraft preferably adjacent the rearward portion thereof.

The outer end of the arm 5 is constituted by a section 19 (see Figs. 6 and 7 also) connected as by an elbow 20 to the main section 15 for limited angular or folding movement between a position in alignment with the main section 15 and collapsed position at an angle thereto, as illustrated in Fig. 7. A stop 21 limits the movement of the outer section 19.

The outer section 19 provides a socket for a shank portion 22 of the hook 3, which latter is attached to a portion 2f of the transfer line 2 which is led into the outer end of the section 19 and out through an opening 23; the transfer line 2 is trained around a sheave 24 suitably secured adjacent the opening 23. The hook 3 may be provided with a closing latch 25 maintained in closed position by a spring 26 to retain any line or other member entering or engaged by the hook.

A burden release member 27 (Fig. 7) may be pivotally connected to the end section 19 and maintained in closed position thereagainst by a tension spring 28. The burden release member 27 may be actuated by any desirable means such as a burden release line 6 which is trained around a sheave 29 adjacent the elbow 20 and which line 6 terminates at a position within convenient reach of the pilot or operator. An actuating member 8 may be attached to the end of the burden release line 6 (see Fig. 1).

The present invention may be employed with any suitable type of ground station, but for the purpose of facilitating a disclosure of the invention, there is shown herein a ground station 10 (Fig. 1) comprising spaced poles 11 supporting quick releasing support clips 12 which detachably support a pick-up line 13 in position to be engaged by the hook 3 when the aircraft is suitably flown past the ground station 10. A burden container 7 is attached to the pick-up line 13 in a suitable manner and may be supported in any suitable manner as by placing it on the ground or on a platform 14.

The control device 4 for paying out or drawing in the transfer line 2 comprises generally a winch or reel 61, an automatic brake 80 (see Fig. 8) operative to place the maximum braking effort upon the reel upon a predetermined number of revolutions thereof, a motor 160 (Fig. 8) for rotating the reel, and a shock-absorbing device 51 (Fig. 2).

Referring now particularly to Figs. 2 and 8, the control device includes a frame 50 which supports the reel 61 and the shock absorber 51. The latter includes a shock strut of the air-oil type, which may be of any ordinary construction, and which includes a piston 52 vertically slidable in a cylinder 53.

Carried at the upper end of the movable piston 52 and rigid thereto is a cross arm 54 having paired sheaves 55 freely rotatable on pivot pins 56 at the ends of the cross arm; guides 57 preferably are associated with the sheaves for preventing the associated line from being displaced.

A stationary cross arm 58, generally similar to the cross arm 54, is rigidly secured to the frame 50 and carries a sheave 59 at each end.

The transfer line 2 is attached at one end to the reel 61, preferably by a connection which will permit the end to be released in the event of emergency. Referring to Fig. 12, the end of the line 2 is secured in a socket 200 threaded on a stud 201 carried by or formed integral with a weakened stem 202. The stem 202 is carried by and preferably integral with a bracket 203, attached as by bolts to one of the flanges of the reel 61.

The transfer line 2 has a part 2a (see Fig. 2) extending upwardly from the reel 61 and is trained successively around the sheaves 55 in a rectangular path having the vertical parts 2b and 2c. The line has a part 2d extending downwardly from the right hand upper sheave, past the reel 61 and close to the periphery thereof. The transfer line 2 is trained around a guide sheave 60 rigidly mounted adjacent the bottom of the aircraft and the part 2e extends through a hatch 9 in the bottom of the aircraft and to the sheave 23 (above mentioned) secured in the end section 19 of the transfer arm 5 (see Fig. 1).

Referring now particularly to Fig. 8, the reel 61 is fixedly carried by a shaft 62 journaled at one end in a bearing 63 mounted in the frame member 48 and provided with a seal 65 and a cover 66. The reel 61 includes a cylindrical rim 67 connected by a web 68 to a hub 69 and having at one end a retaining flange 71. A spirally grooved cylindrical sleeve 70 is positioned about the cylindrical portion 67 and is secured in position by a retaining flange 72 attached to the rim 67 as by bolts 73. The reel 61 is suitably secured against axial or angular displacement on the shaft 62 and abuts a positioning shoulder 74.

A brake plate 75 (Figs. 8 and 9) may be attached to and carried by the reel 61. The brake plate 75 is provided with a plurality of circumferentially spaced lugs 76 which are set in notches 77 formed in lugs 78 which extend inwardly from the cylindrical portion 67. The plate 75 thus is capable of moving axially but is locked against angular movement relative to the reel 61.

A brake 80 cooperates with the brake plate 75 and includes a driving brake disc or support 81 having a suitable friction lining 82 secured to its face and adapted to bear against the brake plate 75. The brake disc 81 is carried by (and in the present embodiment, integral with) a hub 83 which carries a bearing 84 mounted on the shaft 62 and retained by a ring 85.

The hub 83 has a journal-and-bearing portion 86 which receives a bearing 88 positioned by a ring 91. A sleeve 89 abutting a shoulder 90 on the shaft assists in positioning the bearing 88 on the shaft 62. The bearing and journal portion 86 is itself journaled in a bearing 87 mounted in the side wall 49 of the frame 50 and secured by a ring 205. Thus the bearing 87 constitutes, with the bearing 63, the main bearings for supporting the shaft 62 rotatably in the frame 50.

Cooperating with the brake plate 75 and the brake plate disc 81 is a driven brake disc or shoe 92 of annular form having frictional lining 93 on its face bearing against the brake plate 75. The brake discs 81 and 92 are resiliently urged lightly toward the brake plate 75 by bolts 210 each extending through the brake disc 92, the interior opening of the ring 75 and through a suitable opening 211 in the brake disc 81 and carrying a spring 212 bearing against the brake disc 81 and against an adjusting nut or nuts 213.

Extending from the brake disc 92 is a plurality (in the present case 3) of studs 94 which extend through openings 98 in the brake disc 81. Pivotally connected to each stud 94 by a pivot pin 95 is an operating lever 96 which carries at the end of its shorter arm a roller 97 adapted to bear against a boss 99 projecting from the adjacent face of the brake disc 81. The end of the long arm of the actuating lever 96 is pivotally connected as by a pivot pin 100 to a socket 101 attached to an actuating rod 102 which extends through the journal and bearing portion 86. The actuating rod 102 is connected by a spring 103 to a stud 104 which is threaded into a disc 105.

Upon movement of the disc 105 (effected in a manner hereinafter to be described) in a direction away from the brake disc 81 (to the right as viewed in Fig. 8) the actuating rods 102 are moved in a similar direction to thereby rock the levers 96 in a clockwise direction causing the rollers 97 to bear upon their respective bosses 99 and to clamp the brake disc 92 and the brake plate 75 against the brake disc 81. Owing to the lug and notch connection between the brake plate 75 and the reel 61, the brake plate is thereby permitted to shift axially and allow the clamping action to take place.

In order to cause the actuating disc 105 to move outwardly and to apply the brake 80 upon a predetermined number of revolutions of the reel 61, an automatic brake actuating mechanism is provided which will now be described.

The disc 105 is non-rotatably connected to the journal and bearing member 86 by a stud 110 which extends through the disc 105 and is threaded into the member 86. The disc 105 is mounted on a collar 111 having a flange 112 at one end and a ring 113 at the other end, the disc 105 and collar 111 being thus permitted to have relative axial sliding movement which is limited in extent by the flange 112 and ring 113.

The collar 111 is adjustably threaded onto an outer sleeve 114 and is positioned non-rotatably thereon by a spring 115 adapted to enter into any one of a plurality of circumferentially spaced, axially extending notches or slots 116. The spring 115 can be raised out of its notch and the collar 111 turned on the outer sleeve 114 to adjust the axial position of the collar 111 and thereby adjust the time at which the flange 112 strikes against the disc 105.

The outer sleeve 114 is threaded onto an inner sleeve 117 by large screw threads which permit the sleeve 114 to turn on the inner sleeve 117 and to be advanced thereby in an axial direction. The inner sleeve 117 is non-rotatably secured to the shaft 62 as by a key 118.

Movement of the sleeve 114 on the inner sleeve 117 is limited by a flange 119 at the inner end of the inner sleeve 117 and by a ring 120 non-rotatably secured on the shaft 62 as by a key 121 and a nut 123 and abutting the outer end of the sleeve 117. In order to permit axial movement of the outer sleeve 114 on the inner sleeve 117, a recess 124 is formed in the outer sleeve 114 of sufficient diameter to accommodate the ring 120. For the purpose of manually turning the outer sleeve 114, a flange 122 is provided at its outer end and has sockets 125 for a spanner.

In order to provide a suitable braking action or drag on the outer sleeve 114 to prevent it from rotating except when desired, a friction brake may be provided (see Figs. 8 and 11). The friction brake includes a brake ring 130 which surrounds the outer sleeve 114 and preferably seats in a circumferential groove 134 to prevent displacement of the ring 130. The brake ring 130 may be of the split ring type, the tension of which may be adjusted by a nut 132, a suitable brake lining 133 being provided. The brake ring 130 is formed with a lug or extension 131 having an opening 136 through which the stud 110 passes whereby the brake ring 130 is non-rotatably connected to the member 86.

It will now be seen that upon rotation of the shaft 62 which carries the reel 61, the inner sleeve 117 is rotated correspondingly and through the action of its threads causes the outer sleeve 114 to be moved axially and that by providing suitable direction to the threads on the sleeves 114 and 117 the sleeve 114 will be moved in a direction away from the frame member 49 (to the right, as viewed in Fig. 8). As the outer sleeve 114 moves outwardly, the flange 112 is brought into abutment with the disc 105 and moves it in a corresponding direction, thereby exerting a pull on the several actuating rods 102 and causing the brake disc 92 and the brake plate 75 to clamp more tightly against the brake disc 81. The brake 80 therefore is automatically applied with continuously increasing force until the reel 61 is halted or until the end of the socket or recess 124 abuts the ring 120. Thereafter, the braking action will be constant and as the burden is accelerated to the speed of the aircraft the force applied to rotate the reel will decrease and consequently it will halt.

In order to rotate the reel 61 so as to draw in or pay out the transfer line 2, suitable rotating means are provided, which in the present case, comprise a driving motor 160 connected to the brake 80.

Referring now particularly to Figs. 8 and 9, a drive gear 150 is rigidly secured to the brake disc 81 as by bolts 151 and a driving pinion 152 meshes with the gear 150. The driving pinion is carried on a shaft 153 journaled in a bearing 154 secured in a portion of the frame member 49 as by a ring 155 and sealed by a seal 157.

The shaft 153 constitutes also the shaft of a motor 160 and extends into the housing 158 of the motor which is secured to a bracket forming a portion of the frame member 49. The housing is closed by an end plate 159 and the shaft sealed therein by a seal 161. The motor may be of any suitable construction to be operated by fluid pressure and may, for example, include a gear 162 carried on the shaft 153 meshing with a gear 163 carried on a shaft 164 journaled in the housing 158.

In order to lock the shaft 153 of the motor 160 against rotating and consequently prevent rotation of the gear 150 and the brake 80, a brake 166 is provided. This brake includes a drum 167 non-rotatably secured to the shaft 153 as by a key 165 and having a band 168 anchored as at 169 and extending around the drum 167. The band 168 enters a socket 170 and is pivotally connected by a pivot pin 172 to a bell crank lever 171 pivoted at 173 and pivotally connected as at 174 to a rod 175 attached to a piston 176 slidable in a cylinder 177 of a brake actuating device 180. The piston 176 is normally urged into its lower and "exhaust" position by a spring 178 bearing against a plate 179 secured to the cylinder 177, the brake thereby being normally applied.

The motor 160 and brake actuating device 180 just described are actuated and controlled by a fluid system, such as an oil system, receiving pressure through a supply pipe 192 from a suitable pressure source (not shown). The supply pipe 192 leads to a valve 181 actuated by a handle 182 which valve is connected through pipes 183 and 184 with the motor. A discharge pipe 185 leads from the valve 181.

The valve 181 can be adjusted so that the pipe 183 is connected to the supply pipe 192 and the other pipe 184 is connected with the discharge conduit 185; in this position the gear motor 160 is driven in one direction. The valve handle 182 can, alternatively be adjusted to another position wherein the pipe 184 is connected to the supply pipe 192 and the pipe 183 is connected to the discharge pipe 185 whereupon the motor is driven in a reverse direction. The valve 181 can also be set at closed position, as illustrated in Fig. 10.

The supply pipe 192 also leads to a valve 187 controlled by handle 188. The valve 187 is connected by a pipe 189 to the interior of the cylinder 177, whereby when the valve is set in one position, fluid under pressure is admitted to the cylinder 176. A discharge pipe 191 leads from the valve 187 whereby the cylinder 177 can be exhausted.

It will further be understood that by adjusting the nut or nuts 213 the initial tension on the spring 212 may be adjusted and consequently the frictional resistance between the brake plate 92, brake disc 75, and brake plate 81 can be set.

Furthermore, by adjustment of the collar 111 the number of turns of the reel which will be required to set the brake 80 may be controlled. Similarly the amount of cable which may be paid out before the brake is fully set may be adjusted. Thus by proper adjustment of the initial tension on the springs 212 and the positioning of the collar 111 the accelerating effect of the brake on the reel 61 and consequently the acceleration on the burden to be picked up can be controlled within limits.

The operation of the apparatus is as follows when a pick-up and delivery is to be made:

In normal flight the transfer arm 5 will be in retracted position as illustrated in Fig. 5. The burden 7x to be delivered is attached to the arm 5 by the burden release member 27. The valve 187 (Fig. 10) is operated to release the motor brake 160 and the valve 182 is actuated suitably to operate the motor in a direction to pay out the transfer line 2. The arm 5 thereupon swings downwardly and rearwardly (counter-clockwise as viewed in Figs. 1, 4, and 5) and the arm 5 is halted in a position slightly inclined rearwardly from the vertical, as illustrated in Fig. 1.

The aircraft is then flown toward the ground station 10 (Fig. 1) and preferably prior to reaching the posts 11, the actuating member 8 for the burden release line 6 is operated to open the burden release member 27 to allow the burden 7x to be dropped to the ground.

The aircraft is caused to fly at such height that the horizontal part 13a of the ground loop 13 is engaged by the part 2e of the transfer line 2, or by the arm 5, or by the hook 3. The initial impact between the pick-up apparatus carried by the aircraft and the pick-up line 13 detaches the latter from the clips 12 and places an initial tension on the transfer line 2. This initial tension may start the movable cross arm 54 downwardly against the resistance of the shock strut 51 depending upon the adjustment of the strut.

The ground loop 13 slides down along the part 2e of the transfer line 2 and along the arm 5 and into engagement with the hook 3. The inertia of the burden 7 places the transfer line 2 under tension and further compresses the shock strut 51. The movement of the upper cross arm 54 downwardly, however, permits the pick-up line 2 to be payed out a length approximately equal to four times the distance between the upper and lower position of the movable cross arm 54 against the constantly increasing resistance offered by the shock strut 51. Thus the tension applied to the transfer line 2 by the inertia of the burden 7 is gradually applied to the ply 2a and thereby applied to the reel 61 to start it in motion, and the shock which would otherwise be transmitted through the transfer line 2 is damped out.

When a sufficient tension is applied to the ply 2a of the transfer line 2 to initiate rotation of the reel 61 (see Fig. 8), it rotates against the relatively light friction applied to the brake plate 75 by the spring or springs 212 acting upon the brake disc 81 and the brake disc 92.

Rotation of the reel 61 causes a corresponding rotation of the shaft 62 and the inner sleeve 117, thereupon causing the outer sleeve 114 to be moved axially in a direction away from the brake 80. This movement causes the brake disc 92 to be urged to bear with increasing force upon the brake plate 75 and it in turn upon the brake disc 81 and thereby apply increasing drag or resistance upon the reel 61 to gradually retard its rotation.

Before the end of the recess 124 strikes the ring 120, the reel 61 may have been halted and the burden 7 accelerated to the same velocity as the aircraft. During the action of applying the brake, the brake disc 81, and accordingly the cooperating brake disc 92, are held against rotation, by the engagement between the gear 150 and the pinion 152, which latter is locked against rotation by the brake 166 (see also Figs. 10 and 11).

It will be understood that when the transfer line 2 is payed out, the hook 3 moves away from its seat in the end of the transfer arm 5 and draws the transfer line through the end section 19 of the arm. If it is desired to pay out the transfer line 2 more than it is payed out by the rotation of the reel 61 as above described, the motor 160 is suitably operated. Ordinarily, however, the transfer line 2 will be payed out sufficiently by the action of the shock strut 51 and associated members, the rearward swinging of the arm 5, and the rotation of the reel 61 relative to the brake 80.

When the brake 80 has been applied to halt the reel 61, the shock strut will usually (if it has not previously done so) extend under the influence of the air compressed therein and will move the cross arm 54 to its upper position. However, in the event that the shock strut is set for very "soft" operation wherein the resistance to collapsing movement is relatively light, the shock strut may remain collapsed as long as the burden 7 is being dragged behind the aircraft.

After the burden 7 has been accelerated to the speed of the aircraft, the valve 187 (see Fig. 10) is operated to release the brake 166 and the valve 181 operated to energize the motor and rotate the pinion 152 and gear 150. Since the brake 80 remains applied to the reel 61, the reel 61 is rotated and winds in the transfer line 2 until the hook 3 reaches the end of the transfer arm 15 and the shank 22 of the hook enters the end of the outer end section 19. Further rotation of the reel 61 causes the arm 5 to be rotated forwardly (clockwise as viewed in Figs. 1, 4 and 5) to bring the end of the arm adjacent the hatch 9 and finally to turn the end section 19 about its pivot so that it enters the body of the aircraft and brings the pick-up line 13 into position to be removed from the hook 3.

In order to reset the brake operating mechanism, a spanner (not shown) is inserted in the openings 125 of the outer sleeve 114 (Fig. 8) and the latter rotated in a suitable direction so that it is moved inwardly thereby releasing the brake 80 and leaving the reel 61 relatively free to rotate when the next pick-up is made.

It will be understood that while a pick-up and delivery operation has been described, the apparatus is suitable for carrying out either of these operations independently, as well as at approximately the same time. In certain cases, as will be understood, it may be desirable to make a pick-up without a corresponding delivery and vice versa.

Where the term "line" is employed in the foregoing description, it will be understood that this term is generic to any rope, cable or other strand-like material having sufficient strength and flexibility to perform the functions required of it and that such expression contemplates ropes formed of natural or artificial fibres or strands or metal cables or other suitable materials.

It is to be understood that the several portions of the apparatus other than the brake linings will ordinarily be formed of metal of suitable composition, and wherever possible, they will be formed of lightweight metal, as for example, aluminum or aluminum alloys. All parts, of course, will be constructed of a material of sufficient strength, rigidity and wear resisting characteristics to perform the desired functions and to provide satisfactory life.

While certain novel features of the invention have been disclosed herein, and are pointed out in the annexed claims, it will be understood that various omissions, substitutions and changes may be made by those skilled in the art without departing from the spirit of the invention.

What is claimed is:

1. The combination with an aircraft of means for picking-up burdens while said aircraft is in flight, said means including a reel, a shock strut associated with said reel, a pick-up arm pivotally connected to said aircraft adjacent the rearward portion thereof, a guideway and a seat in said transfer arm, a transfer line attached at one end to said reel and trained over said shock strut and non-disengageably through the guideway in said pick-up arm, a hook connected to the other end of said transfer line and positioned in said seat, whereby reeling in said line operates to swing said arm to inoperative position.

2. The combination with an aircraft of means for picking-up burdens while said aircraft is in flight and for reducing the shock and strain to said aircraft and said burdens incident to said pick-up, said means comprising a rotatable reel, a transfer line attached at one end to said reel, a hook attached to the other end of said transfer line, said hook and transfer line adapted to engage a burden to be picked-up and to cause said reel to rotate, means including a shock dampening device associated with said reel and said transfer line and adapted to relieve the strain on said transfer line while said reel is being accelerated, automatic brake applying means adapted to be actuated by rotation of said reel, said brake applying means including means for progressively increasing the force of the brake to a predetermined maximum, and a pick-up arm pivotally connected to said aircraft adapted to guide said transfer line and seating said hook.

3. The combination with an aircraft of a transfer line, a reel carried by said aircraft for drawing in and paying out said transfer line, a hook attached to said transfer line, automatic braking means associated with said reel and operative to halt said reel upon the drawing out of a predetermined length of transfer line, a transfer arm pivotally connected to said aircraft and having at least a portion exteriorly thereof, means carried by said arm for holding and positioning said hook, and an air-oil shock dampener associated with the part of the transfer line intermediate said reel and said hook.

4. The combination with an aircraft of means for picking-up burdens while said aircraft is in flight, said means including a reel, a line, means attaching said line to said reel, said means adapted to break when a predetermined load is placed thereon, a hook attached to said line, means associated with said reel and said line adapted to absorb a part of the energy transmitted through said line to said reel upon contact of said hook with a burden to be picked up and operative to reduce the strain to said line when said burden is picked up, said means for absorbing a part of said energy comprising a shock strut said shock strut having spaced supports yieldably held apart, a plurality of sheaves journaled on said supports, said line trained over said sheaves to form a plurality of plies whereby, when a strain is placed on said line, said shock strut will be compressed in lesser amount than the amount of line which will be permitted to pay out when the strain is placed thereon.

5. In an automatic winch for airplanes and the like, a frame, a rotatable support journaled in said frame, a drum also journaled in said frame, spring devices operating between said support and drum for exerting constant initial light friction on said drum, devices controlled by rotation of said drum for increasing the frictional pressure between said support and said drum to a predetermined maximum, and means for thereafter maintaining the pressure substantially constant at said maximum during continued rotation of the drum.

6. In an automatic winch for airplanes and the like, a frame, a rotatable support journaled in said frame, a drum also journaled in said frame, devices operatively connected between said support and drum for exerting friction on said drum, means operating between said drum and said support for increasing the friction between said support and said drum to a desired maximum force, means for adjusting said means to change the value of said maximum force, and means for adjusting said means to change the number of relatively free revolutions before maximum force is applied.

7. In a pick-up system for picking up a burden from a moving craft, devices for establishing connection between said craft and burden, said devices comprising a winch having a drum, a line wound on said drum and a pick-up device connected to said line, a brake support having a brake surface, said brake surface having light frictional engagement with said drum, means controlled by the number of revolutions of said drum relative to said brake support for increasing the friction between said brake support and drum to maximum braking pressure, a source of power for driving said support, means for connecting or disconnecting said source and said support, a brake for holding said support stationary when said source is disconnected, and an air-oil shock dampener associated with said line between the pick-up device and the drum, said dampener permitting increase in the effective length of said line between the drum and pick-up device independent of the unwinding of said drum.

8. In a pick-up system for launching a burden from a moving craft, devices for establishing connection between said craft and burden, said devices comprising a winch having a drum, a line wound on said drum and a pick-up device connected to said line, a brake support having a brake surface engageable with said drum, said brake support permitting relatively free rotation of said drum, means controlled by rotation of said drum for gradually increasing frictional engagement between said support and drum, a source of power for driving said support, and an elastic device associated with said line between the pick-up device and the drum.

9. In an automatic winch for airplanes and the like, a frame, a reel rotatably mounted in said frame, a support rotatably mounted in said frame, said support comprising a main brake disc and an adjustable brake disc, a third brake disc secured to the reel and disposed between said first-mentioned brake discs, adjustable spring means for adjusting the initial tension between said brake discs, an inner threaded sleeve rotatable with said reel, an outer threaded sleeve rotatable with said support, an adjustable collar threaded on said outer sleeve, said collar having an abutment, a ring surrounding said collar, brake applying linkage secured to said support, springs connecting said linkage and said ring, an auxiliary brake device operating between said support and said outer sleeve to prevent accidental rotation of said outer sleeve, said outer sleeve being adjustable with respect to said support and to said inner sleeve to adjust the maximum increase in tension applied to the winch, said collar being adjustable on said outer sleeve to limit the number of relatively free revolutions of said winch.

10. In an automatic winch for airplanes and the like, a frame, a reel rotatably mounted in said frame, a support rotatably mounted in said frame, said support comprising a main brake disc and an adjustable brake disc, a third brake disc secured to the reel and disposed between said first-mentioned brake discs, an inner threaded sleeve rotatable with said reel, an outer threaded sleeve rotatable with said support, an adjustable collar threaded on said outer sleeve, said collar having an abutment, a ring surrounding said collar, brake applying linkage secured to said support, springs connecting said linkage and said ring, means operating between said support and said outer sleeve to prevent accidental rotation of said outer sleeve, said outer sleeve being adjustable with respect to said support and to said inner sleeve to adjust the maximum increase in tension applied to the winch, said collar being adjustable on said outer sleeve to limit the number of relatively free revolutions of said winch.

11. In an automatic winch for airplanes and the like, a frame, a brake support journaled in the frame, a drum also journaled in said frame, a line wound on said drum, a main brake operating between said support and drum, brake applying mechanism operating between said drum and said support for gradually increasing friction of said main brake, said brake applying mechanism including a control member movable from an initial position to a final position, said control member when in its initial position causing said brake to exert little or no friction on said drum, said control member when moving from initial to final position, causing said brake to exert gradually increasing friction on said drum, said control member, when in its final position causing said brake to exert substantially constant relatively high friction on said drum, controllable means for driving said brake support, means for holding said brake support stationary when said drum is unwinding under force applied by said line.

12. In an automatic winch for airplanes and the like, a frame, a brake support journaled in the frame, a drum also journaled in said frame, a line wound on said drum, a brake operating between said support and drum, brake applying mechanism operating between said drum and said support for gradually increasing the friction of said brake, said brake applying mechanism including a control member movable from an initial position to a final position, said control member, when in its initial position, causing said brake to exert relatively light friction on said drum without substantially impairing the ability of said drum to accelerate when unwinding force is applied to said line, said movable control member, when moving from initial to final position, causing said brake to exert gradually increasing friction on said drum, said control member, when in its final position, causing said brake to exert substantially constant relatively high friction on said drum, controllable means for driving said brake support in either direction, means for holding said brake support stationary when said drum is unwinding under force applied by said line, and adjusting devices included in said brake applying mechanism for adjusting the value of said relatively high friction for any particular shock absorbing operation.

13. In an automatic winch for absorbing the shock incident to accelerating a load by an aircraft in flight, a frame, a drum journaled in said frame, a line wound on said drum, a rotatable brake support journaled in said frame, said drum and brake support carrying sets of brake elements sandwiched together and constituting a main brake, one set being attached to said drum and the other set being attached to said brake support, radial fingers pivoted to said brake support for applying pressure to said sandwiched brake elements, a brake operating screw rotatable with said drum, a brake-operating nut on said screw and movable lengthwise thereof during a shock absorbing operation from an initial position to a final position, a brake applying linkage connecting said nut and said radial fingers for controlling said main brake, adjustable means for adjusting the maximum pressure applied to said fingers by said linkage, a gear secured to said brake support, a drive shaft journaled in said frame, a pinion on said drive shaft meshing said gear, a winch motor for driving said drive shaft, and a motor brake for holding said drive shaft stationary during a shock absorbing operation.

14. In an automatic winch for absorbing the shock incident to accelerating a load by an aircraft in flight, a frame having spaced bearings, concentric main shafts rotatably mounted between said bearings, a drum affixed to one of said shafts, a line wound on said drum, a rotatable brake support affixed to the other of said shafts, said drum and brake support carrying sets of brake elements sandwiched together and constituting a main brake, one set being attached to said drum and the other set being attached to said brake support, radial fingers pivoted to said brake support for applying pressure to said sandwiched brake elements, a brake operating screw rotatable with said drum, a brake-operating nut on said screw and movable lengthwise thereof during a shock absorbing operation from an initial position to a final position, a brake applying linkage connecting said nut and said radial fingers for controlling said main brake, adjustable means concentric of said main shafts for adjusting the maximum pressure applied to said fingers by said linkage, a gear secured to said brake support, a drive shaft journaled in said frame, a pinion on said drive shaft meshing said gear, a winch motor for driving said drive shaft, a motor brake for holding said drive shaft stationary during a shock absorbing operation, the parts of the winch being so arranged that said main brake applies sufficient light friction to said drum to put it under control of said winch motor but not sufficient to prevent relatively free rotation of the drum at the beginning of a shock absorbing operation, said brake operating nut and screw gradually increasing the force exerted by said main brake on the drum as the latter is unwound by said line during a shock absorbing operation, said gradual increase continuing until the brake operating nut has reached its final position after which the force applied to said drum by said main brake remains constant at the adjusted maximum value.

15. In an automatic winch for airplanes and the like, a frame, a rotatable support journaled in said frame, a drum also journaled in said frame, said support being frictionally engageable with said drum, devices operatively connected with said support for exerting initial friction on said drum, threaded means operatively connected with said drum and said support for gradually increasing in accordance with the pitch of said threaded means the friction between said support and said drum to a predetermined maximum, means for discontinuing the operative connection of said threaded means, a controllable brake for holding said support, and controllable means for driving said support.

16. In an air launching system, an aircraft, an object to be launched by said aircraft, apparatus establishing connection between said aircraft and said object comprising a winch having a drum, a line wound on said drum, said winch comprising a frame, a rotatable support rotatably mounted on said frame, said drum being rotatably mounted on said frame, said support being frictionally engageable with said drum, devices for exerting initial light friction on said drum, means controlled by rotation of said drum for increasing the frictional pressure between said support and said drum to a predetermined maximum, means for retaining said predetermined maximum pressure at a substantially constant value to complete the launching operation, a controllable brake for holding said support stationary during a launching operation, and controllable means for rotating said drum to wind up said line.

17. In an air launching system, an aircraft, an object to be launched by said aircraft, apparatus establishing connection between said aircraft and said object comprising a winch having a drum, a line wound on said drum, a brake support having a brake surface engageable with said drum, said brake support permitting relatively free rotation of said drum, means controlled by the rotation of said drum for gradually increasing frictional pressure between said brake surface and said drum, a controllable brake for holding said support stationary during launching operation, and controllable means for rotating said drum to wind up said line.

18. In an automatic winch for aircraft and the like, a frame, a drum journaled in said frame, a line wound on said drum, said drum being rotatably mounted on said frame, devices for exerting initial light friction on said drum to hold it stationary at the beginning of the launching operation, means controlled by the rotation of said drum for gradually increasing the frictional pressure exerted on said drum to a predetermined maximum to minimize shock on said line, means for retaining said predetermined maximum pressure at a constant value to complete the launching operation and controllable means for rotating said drum to wind up said line.

19. In an air launching system; an aircraft; an object to be launched by said aircraft; apparatus establishing connection between said aircraft and said object comprising a winch having a drum; a line wound on said drum; said winch comprising a frame; said drum being rotatably mounted on said frame; retarding means for said drum; said retarding means comprising, means for preventing pay-out of the line prior to the establishment of connection between said aircraft and said object, means for applying frictional pressure to said drum, said means for applying frictional pressure being controlled by the rotation of said drum to gradually increase the frictional pressure exerted on said drum from a relatively small amount to a predetermined maximum to minimize shock on said line, and means for retaining said predetermined maximum pressure at a constant value to complete the launching operation; and controllable means for rotating said drum to wind up said line.

STUART C. PLUMMER.